United States Patent
Hong

(10) Patent No.: US 11,158,185 B2
(45) Date of Patent: Oct. 26, 2021

(54) METHOD AND APPARATUS FOR CONTROLLING CONTROLLABLE DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 60 days.

(21) Appl. No.: 16/631,381

(22) PCT Filed: Jul. 28, 2017

(86) PCT No.: PCT/CN2017/094931
§ 371 (c)(1),
(2) Date: Jan. 15, 2020

(87) PCT Pub. No.: WO2019/019159
PCT Pub. Date: Jan. 31, 2019

(65) Prior Publication Data
US 2020/0152048 A1 May 14, 2020

(51) Int. Cl.
*H04W 4/00* (2018.01)
*G08C 17/02* (2006.01)
(Continued)

(52) U.S. Cl.
CPC ............ *G08C 17/02* (2013.01); *H04W 60/00* (2013.01); *H04W 76/14* (2018.02); *H04W 84/12* (2013.01)

(58) Field of Classification Search
CPC ..... H04W 84/12; H04W 76/14; H04W 60/00; H04W 76/15; H04W 4/80; H04W 76/10; G08C 17/02; H04B 7/18506
(Continued)

(56) References Cited

U.S. PATENT DOCUMENTS 9,477,432 B2   10/2016   Sato
9,594,372 B1*   3/2017   Sills .................. A61H 3/06
(Continued)

FOREIGN PATENT DOCUMENTS

CN   102118682 A   7/2011
CN   104950906 A   9/2015
(Continued)

OTHER PUBLICATIONS

Extended European Search Report in European Application No. 17919259.6, dated Jul. 3, 2020.
(Continued)

*Primary Examiner* — Marceau Milord
(74) *Attorney, Agent, or Firm* — Finnegan, Henderson, Farabow, Garrett & Dunner, L.L.P.

(57) ABSTRACT

The present disclosure provides a method and apparatus for controlling a controllable device. The method includes: establishing a cellular network connection to a base station after a start-up operation is completed; establishing a wireless fidelity (WIFI) network connection to a control apparatus for controlling the controllable device after establishing the cellular network connection to the base station; and transmitting control signaling with the base station through the cellular network connection, and transmitting data with the control apparatus through the WIFI network connection; wherein the controllable device is a multi-mode controllable device that supports both a cellular communication mode and a WIFI communication mode. The present disclosure can transmit control signaling of the controllable device through a cellular network with high service quality and transmit data though a WIFI network with a fast transmission speed, thereby achieving efficient transmissions of control signaling and data of the controllable device.

20 Claims, 11 Drawing Sheets

(51) Int. Cl.
*H04W 76/14* (2018.01)
*H04W 60/00* (2009.01)
H04W 84/12 (2009.01)

(58) Field of Classification Search
USPC .................. 370/328, 329, 311, 230, 338
See application file for complete search history.

(56) References Cited

U.S. PATENT DOCUMENTS

| | | | |
|---|---|---|---|
| 10,044,465 B1* | 8/2018 | Hetsko | G08G 5/0026 |
| 10,351,240 B1* | 7/2019 | Sills | H04B 7/18506 |
| 2007/0284474 A1 | 12/2007 | Olson et al. | |
| 2009/0233594 A1* | 9/2009 | Duschesne | H04W 52/247 |
| | | | 455/423 |
| 2014/0085675 A1* | 3/2014 | Watanabe | H04N 1/32786 |
| | | | 358/1.15 |
| 2014/0171031 A1* | 6/2014 | Takada | H04W 36/0038 |
| | | | 455/411 |
| 2015/0254988 A1* | 9/2015 | Wang | G08G 5/006 |
| | | | 701/3 |
| 2017/0023939 A1 | 1/2017 | Krouse et al. | |
| 2017/0064498 A1* | 3/2017 | Manges | H04W 4/029 |
| 2017/0146995 A1 | 5/2017 | Stamatovski et al. | |
| 2018/0014162 A1* | 1/2018 | Zavesky | H04M 1/72409 |
| 2018/0068567 A1* | 3/2018 | Gong | G08G 5/0034 |
| 2018/0375568 A1* | 12/2018 | De Rosa | H04W 72/04 |
| 2020/0143692 A1* | 5/2020 | Geng | G08G 5/0069 |
| 2020/0225684 A1* | 7/2020 | Anderson | G05D 1/0022 |

FOREIGN PATENT DOCUMENTS

| | | |
|---|---|---|
| CN | 106094553 A | 11/2016 |
| CN | 106603807 A | 4/2017 |

OTHER PUBLICATIONS

KDDI, Proposal of potential LTE enhancements for Aerial Vehicles, 3GPP TSG-RAN2 Meeting #98, R2-1705999, Hangzhou, China, May 15-19, 2017, 5 pages.

International Search Report issued for International Application No. PCT/CN2017/094931, dated Dec. 21, 2017.

* cited by examiner

METHOD AND APPARATUS FOR CONTROLLING CONTROLLABLE DEVICE

CROSS REFERENCE TO RELATED APPLICATIONS

This application is a national phase application based on PCT/CN2017/094931, filed Jul. 28, 2017, the content of which is incorporated herein by reference.

TECHNICAL FIELD

The present disclosure generally relates to the field of communication technologies, and more particularly, to a method and an apparatus for controlling a controllable device.

BACKGROUND

With rapid development, cost reduction and function improvement of controllable device technologies, application of controllable devices has been more and more popular. For example, nowadays, the application of unmanned aerial vehicles (UAVs) in many fields such as aerial photography, agriculture, plant protection has greatly expanded their uses. Various countries are actively expanding industry applications and developing the controllable device technologies.

SUMMARY

According to a first aspect of embodiments of the present disclosure, there is provided a method for controlling a controllable device, the method being applicable to the controllable device, including:
establishing a cellular network connection with a base station after a start-up operation is completed;
establishing a wireless fidelity (WIFI) network connection with a control apparatus for controlling the controllable device after establishing the cellular network connection with the base station; and transmitting control signaling with the base station through the cellular network connection and transmitting data with the control apparatus through the WIFI network connection, wherein the control signaling is signaling for controlling the controllable device to perform a corresponding operation,
wherein the controllable device is a multi-mode controllable device supporting both a cellular communication mode and a WIFI communication mode.

According to a second aspect of embodiments of the present disclosure, there is provided a method for controlling a controllable device, the method being applicable to a control apparatus for controlling the controllable device, including:
establishing a cellular network connection with a base station after a start-up operation is completed;
establishing a wireless fidelity (WIFI) network connection with the controllable device after establishing the cellular network connection with the base station; and
transmitting control signaling with the base station through the cellular network connection and transmitting data with the controllable device through the WIFI network connection, wherein the control signaling is signaling for controlling the controllable device to perform a corresponding operation.

According to a third aspect of embodiments of the present disclosure, there is provided an apparatus for controlling a controllable device, the apparatus being applicable to the controllable device, including:
a first connection module configured to establish a cellular network connection with a base station after a start-up operation is completed;
a second connection module configured to establish a wireless fidelity (WIFI) network connection with a control apparatus for controlling the controllable device after establishing the cellular network connection with the base station; and
a first execution module configured to transmit control signaling with the base station through the cellular network connection and transmit data with the control apparatus through the WIFI network connection, wherein the control signaling is signaling for controlling the controllable device to perform a corresponding operation,
wherein the controllable device is a multi-mode controllable device supporting both a cellular communication mode and a WIFI communication mode.

According to a fourth aspect of embodiments of the present disclosure, there is provided an apparatus for controlling a controllable device, the apparatus being applicable to a control apparatus for controlling the controllable device, including:
a third connection module configured to establish a cellular network connection with a base station after a start-up operation is completed;
a fourth connection module configured to establish a wireless fidelity (WIFI) network connection with the controllable device after establishing the cellular network connection with the base station; and
a third execution module configured to transmit control signaling with the base station through the cellular network connection and transmit data with the controllable device through the WIFI network connection; wherein the control signaling is signaling for controlling the controllable device to perform a corresponding operation.

According to a fifth aspect of embodiments of the present disclosure, there is provided a computer readable storage medium having stored therein computer programs for performing the method for controlling the controllable device described above according to the first aspect.

According to a sixth aspect of embodiments of the present disclosure, there is provided a computer readable storage medium having stored therein computer programs for performing the method for controlling the controllable device described above according to the second aspect.

According to a seventh aspect of embodiments of the present disclosure, there is provided an apparatus for controlling a controllable device, the apparatus being applicable to the controllable device, including:
a processor;
a memory for storing instructions executable by the processor;
wherein the processor is configured to:
establish a cellular network connection with a base station after a start-up operation is completed;
establish a wireless fidelity (WIFI) network connection with a control apparatus for controlling the controllable device after establishing the cellular network connection with the base station; and
transmit control signaling with the base station through the cellular network connection and transmit data with the control apparatus through the WIFI network connection, wherein the control signaling is signaling for controlling the controllable device to perform a corresponding operation, wherein the controllable device is a multi-mode controllable device supporting both a cellular communication mode and a WIFI communication mode.

According to an eighth aspect of embodiments of the present disclosure, there is provided an apparatus for controlling a controllable device, the apparatus being applicable to a control apparatus for controlling the controllable device, including:

a processor;

a memory for storing instructions executable by the processor;

wherein the processor is configured to:

establish a cellular network connection with a base station after a start-up operation is completed;

establish a wireless fidelity (WIFI) network connection with the controllable device after establishing the cellular network connection with the base station; and transmit control signaling with the base station through the cellular network connection and transmit data with the controllable device through the WIFI network connection; wherein the control signaling is signaling for controlling the controllable device to perform a corresponding operation.

The technical solutions provided by embodiments of the present disclosure may have the following beneficial effects.

In the embodiment of the present disclosure, after the controllable device completes its start-up operation, the controllable device and the base station may perform transmission of the control signaling therebetween through the cellular network connection. In addition, data may be transmitted between the controllable device and the control apparatus through the WIFI network connection. The controllable device is a multi-mode controllable device that supports both a cellular communication mode and a WIFI communication mode. By the above processes, the control signaling of the controllable device may be transmitted through a cellular network with a high quality of service and the data may be transmitted through a WIFI network with a faster transmission rate, thereby realizing efficient transmission of the control signaling and data of the controllable device.

In the embodiment of the present disclosure, the controllable device may send the attach request to the cellular network after completing its start-up operation, wherein the attach request is used for requesting attachment to the cellular network. Further, the cellular communication module provided on the controllable device in advance establishes the cellular network connection with the base station in the cellular communication mode based on the attach request. The cellular communication module may send the first notification message to the WIFI communication module provided on the controllable device in advance after the cellular network connection has been established, and the WIFI communication module establishes the WIFI network connection with the control apparatus in the WIFI communication mode after determining that the first notification message has been received by the WIFI communication module. Through the above processes, the multi-mode controllable device establishes the cellular network connection and the WIFI network connection with the base station and the control apparatus respectively in various communication modes, thus ensuring subsequent transmission of the control signaling and data through different network connections.

In the embodiment of the present disclosure, the controllable device may receive the control signaling forwarded by the base station through the cellular network connection established between the controllable device and the base station, and perform the corresponding operation according to the control signaling, which is sent to the base station from the control apparatus. Therefore, the objective of controlling the controllable device by the control apparatus is achieved and the service quality of the transmitted control signaling may be ensured since the cellular communication mode is a communication mode which uses a frequency band authorized by a network provider.

In the embodiment of the present disclosure, the controllable device may be a UAV, which accordingly may perform at least one of a take-off operation, a landing operation, an operation of flying along a preset trajectory and a data acquisition operation according to the control signaling. In the above embodiment, after it's a start-up operation of the UAV is completed, the UAV may establish the cellular network connection with the base station and establish the WIFI network connection with the control apparatus. The UAV receives the control signaling forwarded by the base station through the cellular network connection, so as to perform at least one of a take-off operation, a landing operation, an operation of flying along a preset trajectory and a data acquisition operation. The control signaling of the UAV is transmitted through the cellular network with a high service quality, thus realizing efficient transmission of the control signaling and ultimately realizing the efficient control of the UAV. In addition, relevant data of the UAV may be transmitted through the WIFI network connection with a faster transmission rate, thus realizing the efficient transmission of the data of the UAV.

In the embodiment of the present disclosure, after a start-up operation of the control apparatus for controlling the controllable device is completed, the control apparatus may also establish the cellular network connection with the base station, and establish the WIFI network connection with the controllable device. Further, the control apparatus and the base station may perform transmission of control signaling therebetween through the cellular network connection, and the control apparatus and the controllable device may perform data transmission therebetween through the WIFI network connection. Through the above processes, the control apparatus may send the control signaling to the base station through the cellular network connection established between the control apparatus and the base station, and then the base station forwards it to the controllable device through the cellular network connection established between the base station and the controllable device, thereby ensuring a service quality of the transmitted control signaling. In addition, data transmission may be performed between the control apparatus and the controllable device through the WIFI network connection. Though the WIFI communication mode is a communication mode adopting a non-authorized frequency band, a transmission rate of the WIFI communication mode is faster than that of the cellular communication mode, so rapid data transmission may be ensured. Finally, efficient transmission of the control signaling and data of the controllable device may be achieved.

In the embodiment of the present disclosure, the control apparatus may also initiate the attach request to the base station after completing its start-up operation, wherein the attach request is used for requesting attachment to the cellular network. Further, the control apparatus establishes the cellular network connection with the base station in the cellular communication mode by the cellular communication module provided on the control apparatus in advance. The cellular communication module may send the second notification message to the WIFI communication module provided on the control apparatus in advance after the cellular network connection has been established, and the WIFI communication module establishes the WIFI network connection with the controllable device in the WIFI communication mode after determining that the second notification message has been received by the WIFI communication module. Through the above processes, the control apparatus may establish the cellular network connection and the WIFI network connection with the base station and the control apparatus respectively in various communication modes, thus ensuring subsequent transmission of the control signaling and data through different network connections.

In the embodiment of the present disclosure, after establishing the WIFI network connection with the controllable device, the WIFI communication module provided on the control apparatus in advance may send the third notification message to the cellular communication module provided on the control apparatus in advance. Further, after the cellular communication module receives the third notification message, the cellular communication module may send the control signaling to the base station through the cellular network connection, and the base station forwards the control signaling to the controllable device, and then the controllable device performs the corresponding operation according to the control signaling. Through the above processes, after the WIFI network connection is established between the control apparatus and the controllable device, the control apparatus sends the control signaling to the base station through the cellular network connection between the control apparatus and the base station, and then the base station forwards the control signaling to the controllable device through the cellular network connection between the base station and the controllable device, so as to control the controllable device to perform the corresponding operation, thereby ensuring the service quality of the transmitted control signaling.

In the embodiment of the present disclosure, when the controllable device is a UAV, the control signaling sent by the control apparatus includes at least one of the following: take-off control signaling, landing control signaling, flight control signaling for flying along a preset trajectory and data acquisition control signaling for data acquisition. In the above embodiment, after the WIFI network connection is established between the control apparatus and the UAV, the control apparatus sends the control signaling to the base station through the cellular network connection between the control apparatus and the base station, and then the base station forwards the control signaling to the UAV through the cellular network connection between the base station and the UAV, so as to control the UAV to perform the corresponding operation, thereby ensuring the service quality of the transmitted control signaling. In addition, data can be transmitted between the UAV and the control apparatus through the WIFI network connection, and the data transmission rate of the WIFI network is fast, thus ensuring efficient transmission of data related to the UAV.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. When the following description refers to the accompanying drawings, the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used herein are merely for describing a particular embodiment, rather than limiting the present disclosure. As used in the present disclosure and the appended claims, terms in singular forms such as "a" and "the" are intended to also include plural forms, unless explicitly dictated otherwise. It should also be understood that the term "and/or" used herein means any one or any possible combination of one or more associated listed items.

It should be understood that, although various information may be described by using terms such as first, second, or third, etc., the information is not limited by these terms. These terms are merely for distinguishing information of the same kind. For example, without departing from the scope of the present disclosure, first information can also be referred to as second information. Similarly, second information can also be referred to as first information. Depending on the context, a term "if" as used herein can be interpreted as "when", "at the time" or "in response to".

Figure 1:
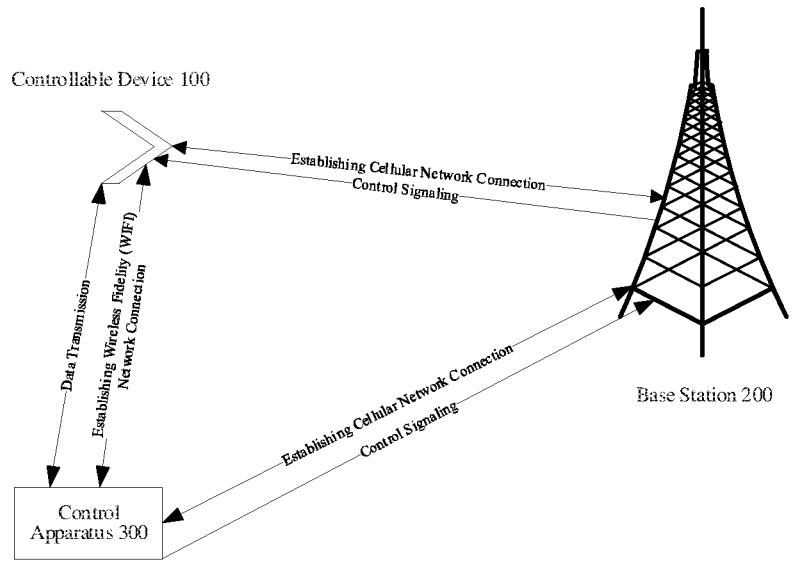
FIG. 1 is a schematic diagram illustrating a scenario for controlling a controllable device according to an exemplary embodiment.

A scenario for controlling a controllable device provided by an embodiment of the present disclosure is illustrated in FIG. 1. A controllable device 100 may be an unmanned aerial vehicle (UAV), and may establish a cellular network connection with a base station 200 after its start-up operation is completed. A control apparatus 300 for controlling the controllable device 100 also establishes a cellular network connection with the base station 200 after its start-up operation is completed. Further, a wireless fidelity (WIFI) network connection is established between the controllable device 100 and the control apparatus 300.

The controllable device 100 may be a multi-mode controllable device that supports both a cellular communication mode and a WIFI communication mode.

After establishing the above-described network connections, the control apparatus 300 may send control signaling to the base station 200 through the cellular network connection between the control apparatus 300 and the base station 200, and then the base station 200 forwards the control signaling to the controllable device 100 through the cellular network connection between the base station 200 and the controllable device 100, thus achieving the objective of transmitting the control signaling through a cellular network with a high quality of service and ensuring a quality of service of the transmitted control signaling.

In addition, the controllable device 100 may perform data transmission through the WIFI network connection between the controllable device 100 and the control apparatus 300, thereby achieving the purpose of data transmission through a WIFI network with a faster transmission rate and ensuring efficient transmission of data of the controllable device.

Hereinafter, introductions will be first made to a method for controlling a controllable device provided by an embodiment of the present disclosure from the perspective of the controllable device.

Figure 2:
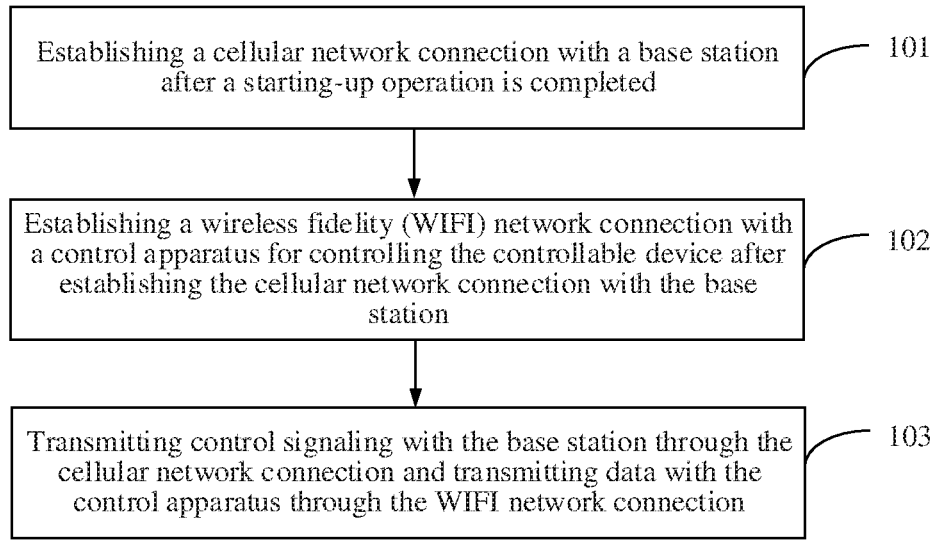
FIG. 2 is a flowchart illustrating a method for controlling a controllable device according to an exemplary embodiment.

An embodiment of the present disclosure provides a method for controlling a controllable device, which may be an unmanned aerial vehicle, an intelligent robot, or the like. FIG. 2 is a flowchart illustrating a method for controlling a controllable device which may be applicable to the controllable device according to an exemplary embodiment. Referring to FIG. 2, the method includes the following steps.

In step 101, a cellular network connection with a base station is established after a start-up operation is completed.

In step 102, a wireless fidelity (WIFI) network connection with a control apparatus for controlling the controllable device is established after establishing the cellular network connection with the base station. In step 103, control signaling is transmitted with the base station through the cellular network connection and data is transmitted with the control apparatus through the WIFI network connection. In the embodiment, the control signaling is signaling for controlling the controllable device to perform a corresponding operation. Optionally, the control signaling may be signaling for controlling the controllable device to perform operations such as take-off, landing, travelling along a preset trajectory, data acquisition of pictures or videos, and the like.

In the above embodiment, the controllable device is a multi-mode controllable device that supports both a cellular communication mode and a WIFI communication mode.

In the embodiment of the present disclosure, after the controllable device completes its start-up operation, the controllable device and the base station may perform transmission of the control signaling therebetween through the cellular network connection. The controllable device is a multi-mode controllable device that supports both a cellular communication mode and a WIFI communication mode. In addition, data may be transmitted between the controllable device and the control apparatus through the WIFI network connection. By the above processes, the control signaling of the controllable device may be transmitted through a cellular network with a high quality of service, and the data may be transmitted through a WIFI network with a faster transmission rate, thereby realizing efficient transmission of the control signaling and data of the controllable device.

For the above step 101, after completing its start-up operation according to relevant technologies, the controllable device, for example, an unmanned aerial vehicle, may initiate an attach request to the base station. The attach request is used for requesting attachment to the cellular network. Further, the controllable device may establish the cellular network connection with the base station by a cellular communication module provided thereon in advance in the cellular communication mode. The cellular communication module supports the cellular communication mode.

In the embodiment of the present disclosure, the communication mode refers to a communication manner for access to different networks. The cellular communication mode is a communication manner for access to the cellular network. Optionally, the cellular communication mode may be a Long Term Evolution (LTE) communication mode.

For the above step 102, after the controllable device has established the cellular network connection with the base station, the controllable device may establish the WIFI network connection with the control apparatus by a WIFI communication module provided thereon in advance in the WIFI communication mode. The WIFI communication module supports the WIFI communication mode. The WIFI communication mode is a communication manner which may access to the WIFI network.

With regard to the above step 103, after the controllable device establishes the WIFI network connection with the control apparatus, the control apparatus may send the control signaling to the base station, and the base station forwards the control signaling to the controllable device through the cellular network connection between the base station and the controllable device, and then the controllable device receives the control signaling directly. The control signaling is signaling for controlling the controllable device to perform the corresponding operation.

The controllable device is an unmanned aerial vehicle, which may correspondingly perform at least one of a take-off operation, a landing operation, an operation of traveling along a preset trajectory and an operation of acquisition of data such as pictures or videos etc. according to the control signaling.

If there is a need for data acquisition while the unmanned aerial vehicle is performing the above operation, after the data acquisition is completed, the unmanned aerial vehicle may send the acquired data to the control apparatus through the WIFI network connection. Further, the control apparatus may display the acquired data, or the control apparatus may send the data acquired by the controllable device to the base station through the cellular network connection established with the base station, and then the base station forwards it to a specified terminal. The specified terminal display, analyze the acquired data, thus ultimately achieving the purpose of carrying out an operation by means of the controllable device.

Figure 3:
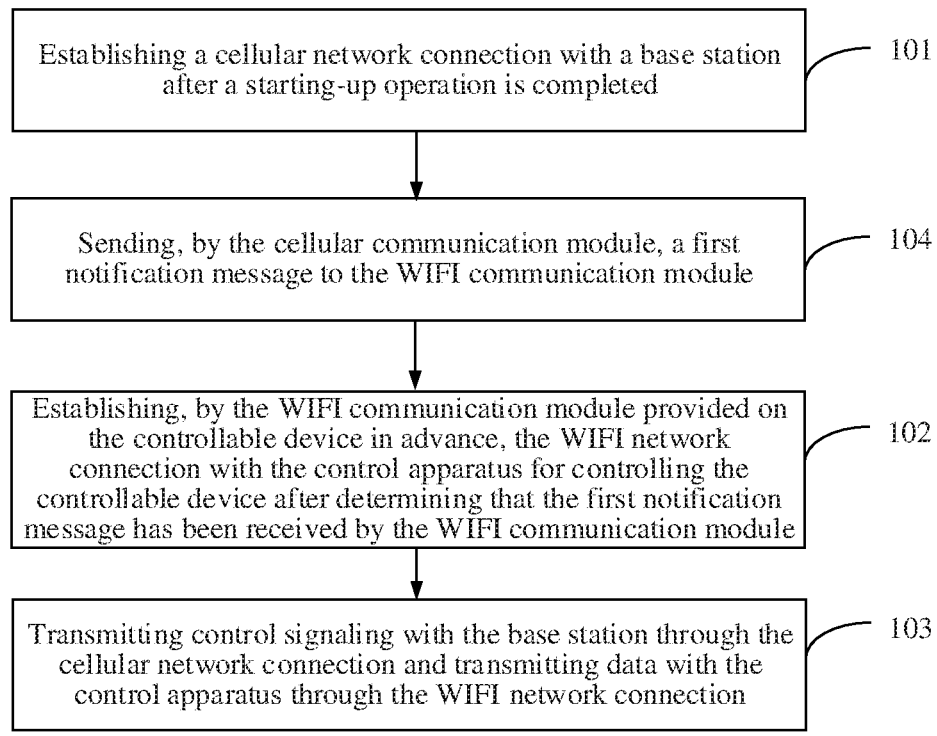
FIG. 3 is a flowchart illustrating another method for controlling a controllable device according to an exemplary embodiment.

In an embodiment, optionally, FIG. 3 is a flowchart illustrating another method for controlling a controllable device according to the embodiment illustrated in FIG. 2. Referring to FIG. 3, the method includes the following step.

In step 104, the cellular communication module sends a first notification message to the WIFI communication module.

In this step, after determining that the cellular network connection has been established with the base station, the cellular communication module sends the first notification message to the WIFI communication module. A content of the first notification message includes that the controllable device has established the cellular network connection with the base station.

After receiving the first notification message, the WIFI communication module may determine that the controllable device has established the cellular network connection with the base station in the cellular communication mode. At this time, the step 102 continues to be performed. The WIFI communication module provided on the controllable device in advance establishes the WIFI network connection with the control apparatus in the WIFI communication mode.

In the foregoing embodiment, after the controllable device establishes the cellular network connection with the base station in the cellular network mode, the cellular communication module sends the first notification message to the WIFI communication module, and at this time, the second notification module may establish the WIFI network connection with the control apparatus in the WIFI communication mode. Therefore, after the start-up operation is completed, the cellular network connection for transmitting the control signaling is established between the controllable device and the base station firstly, and then the WIFI network connection for transmitting data is established, which has high availability.

Figure 4:
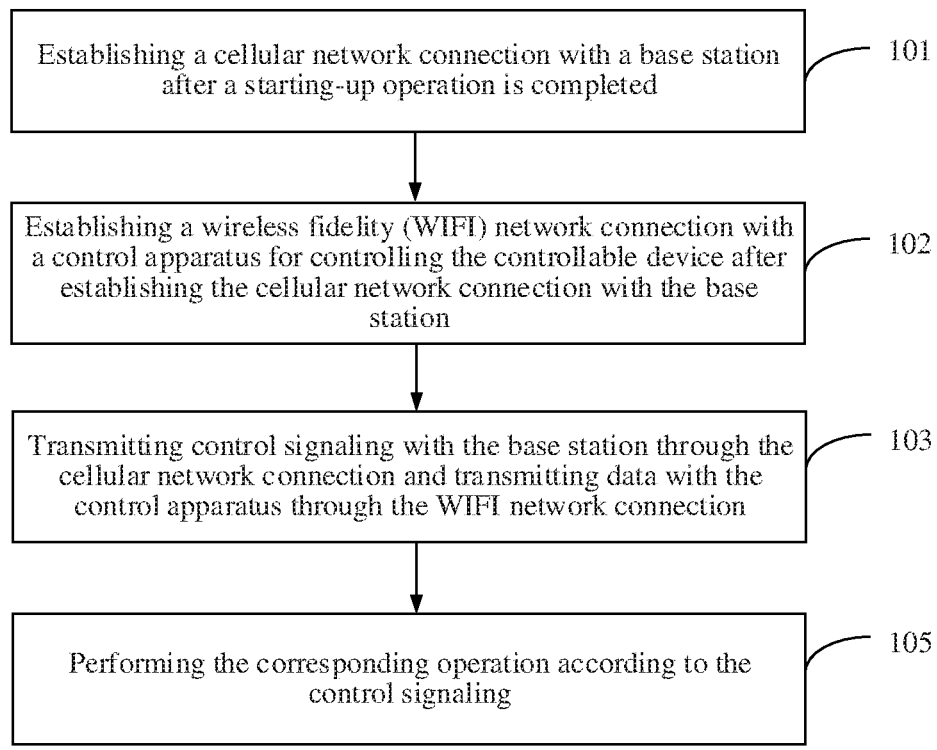
FIG. 4 is a flowchart illustrating another method for controlling a controllable device according to an exemplary embodiment.

In an embodiment, FIG. 4 is a flowchart illustrating another method for controlling a controllable device according to the embodiment illustrated in FIG. 2. Referring to FIG. 4, after the step 103 is carried out, the method further includes the following step.

In step 105, the corresponding operation is performed according to the control signaling.

In this step, the controllable device may be an unmanned aerial vehicle. Correspondingly, the unmanned aerial vehicle may perform for example at least one of a take-off operation, a landing operation, an operation of flying along a preset trajectory and an operation of acquisition of data such as pictures or videos etc. according to the control signaling.

In the foregoing embodiment, the UAV may perform the corresponding operation according to the control signaling forwarded by the base station through the cellular network connection, thereby achieving the purpose of transmitting the control signaling with the highly reliable cellular network and improving a quality of service of the transmitted control signaling.

Hereinafter, introductions will be made to a method for controlling a controllable device provided by an embodiment of the present disclosure from the perspective of a control apparatus for controlling the controllable device.

Figure 5:
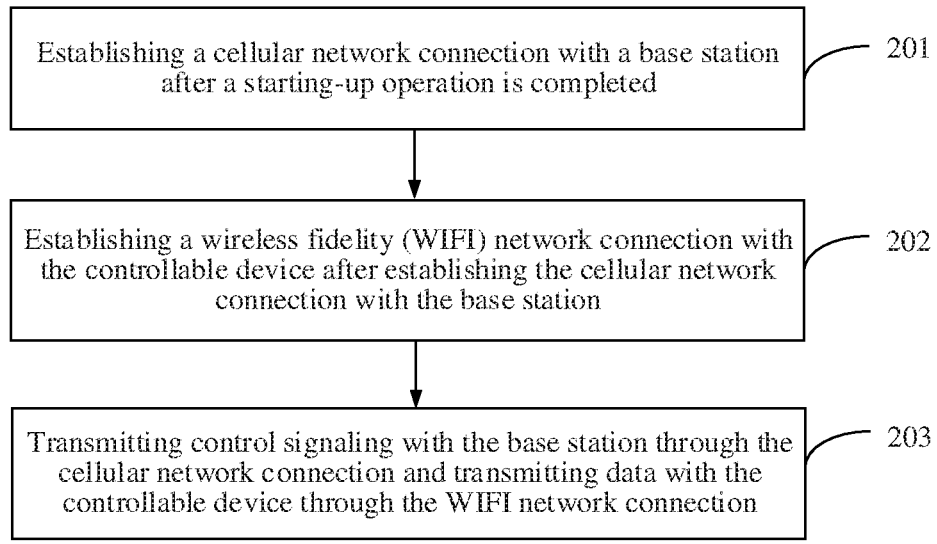
FIG. 5 is a flowchart illustrating another method for controlling a controllable device according to an exemplary embodiment.

An embodiment of the present disclosure provides another method for controlling a controllable device. FIG. 5 is a flowchart illustrating another method for controlling a controllable device which may be applicable to a control apparatus for controlling the controllable device according to an exemplary embodiment. Referring to FIG. 5, the method includes the following steps.

In step 201, a cellular network connection with a base station is established after a start-up operation is completed.

In step 202, a wireless fidelity (WIFI) network connection with the controllable device is established after establishing the cellular network connection with the base station.

In step 203, control signaling is transmitted between the control apparatus and the base station through the cellular network connection and data is transmitted between the control apparatus and the controllable device through the WIFI network connection.

The control signaling is signaling for controlling the controllable device to perform a corresponding operation.

In the above embodiment, after a start-up operation of the control apparatus for controlling the controllable device is completed, the control apparatus also establishes the cellular network connection with the base station, and establish the WIFI network connection with the controllable device. The control apparatus and the base station ay perform transmission of control signaling therebetween through the cellular network connection, and the control apparatus and the controllable device may perform data transmission therebetween through the WIFI network connection. Through the above processes, the control apparatus may send the control signaling to the base station through the cellular network connection between the control apparatus and the base station, and then the base station forwards it to the controllable device through the cellular network connection between the base station and the controllable device, thereby ensuring a service quality of the transmitted control signaling. In addition, data transmission is performed between the control apparatus and the controllable device through the WIFI network connection, and a transmission rate of the WIFI network is faster than that of the cellular network, so rapid data transmission may be ensured. Finally, efficient transmission of the control signaling and data of the controllable device is achieved.

For the above step 201, after completing its start-up operation, the control apparatus may also initiate an attach request to the base station. The attach request is used for requesting attachment to the cellular network. Further, the control apparatus may establish the cellular network connection with the base station in the cellular communication mode, such as an LTE communication mode, by a cellular communication module provided thereon in advance based on the attach request.

For the above step 202, after the control apparatus has established the cellular network connection with the base station, the control apparatus may establish the WIFI network connection with the controllable device in the WIFI communication mode by a WIFI communication module provided there on the control apparatus in advance. The WIFI communication module supports the WIFI communication mode.

With regard to the above step 203, after the control apparatus establishes the WIFI network connection with the controllable device, the control apparatus may send the control signaling to the base station through the cellular network connection between the control apparatus and the base station, and the base station forwards the control signaling to the controllable device through the cellular network connection between the base station and the controllable device, and then the controllable device receives the control signaling directly.

The control signaling is signaling for controlling the controllable device to perform the corresponding operation. Optionally, if the controllable device is a UAV, the control signaling may include at least one of take-off control signaling, landing control signaling, flight control signaling for flying along a preset trajectory and data acquisition control signaling for data acquisition.

If there is a need for data acquisition while the controllable device is performing the above operation, after the data acquisition is completed, the controllable device may send the acquired data to the control apparatus through the WIFI network connection, and the control apparatus may receive the data directly. Further, the control apparatus may display the acquired data, or the control apparatus may send the data acquired by the controllable device to the base station through the cellular network connection established with the base station in advance, and then the base station forwards it to a specified terminal. The specified terminal display, analyze the acquired date, etc., thus ultimately achieving the purpose of carrying out an operation by means of the controllable device.

In the embodiment of the present disclosure, if the control apparatus needs to transmit some data to the controllable device, for example, when the controllable device is used to observe wild animals, the control apparatus may send data of animals to be observed to the controllable device through the WIFI network connection.

Figure 6:
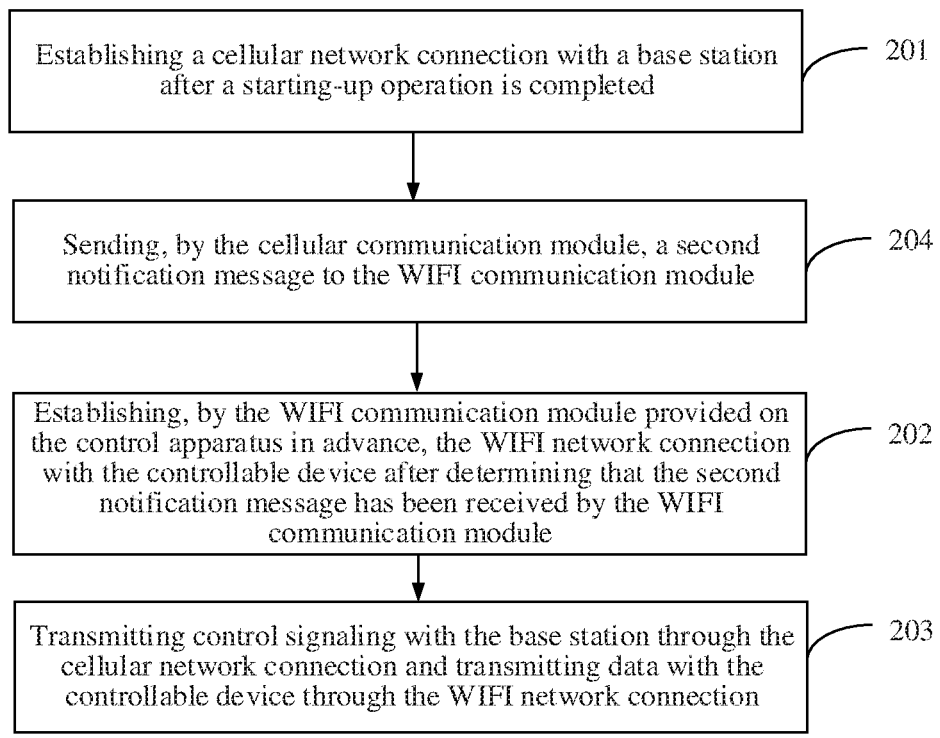
FIG. 6 is a flowchart illustrating another method for controlling a controllable device according to an exemplary embodiment.

In an embodiment, optionally, FIG. 6 is a flowchart illustrating another method for controlling a controllable device according to the embodiment illustrated in FIG. 5. Referring to FIG. 6, the method further includes the following step.

In step 204, the cellular communication module sends a second notification message to the WIFI communication module.

In this step, after determining that the cellular network connection has been established with the base station, the cellular communication module sends the second notification message to the WIFI communication module. A content of the second notification message includes that the control apparatus has established the cellular network connection with the base station.

After receiving the second notification message, the WIFI communication module may determine that the control apparatus has established the cellular network connection with the base station in the cellular communication mode. At this time, the step 202 continues to be performed, the WIFI communication module provided on the control apparatus in advance establishes the WIFI network connection with the controllable device in the WIFI communication mode.

In the foregoing embodiment, after the control apparatus establishes the cellular network connection with the base station in the cellular network mode, the cellular communication module sends the second notification message to the WIFI communication module, and at this time, the WIFI communication module may establish the WIFI network connection with the controllable device in the WIFI communication mode. Therefore, after the start-up operation is completed, the cellular network connection for transmitting the control signaling may be established between the control apparatus and the base station at first, and then the WIFI network connection for transmitting data is established, which has high availability.

Figure 7:
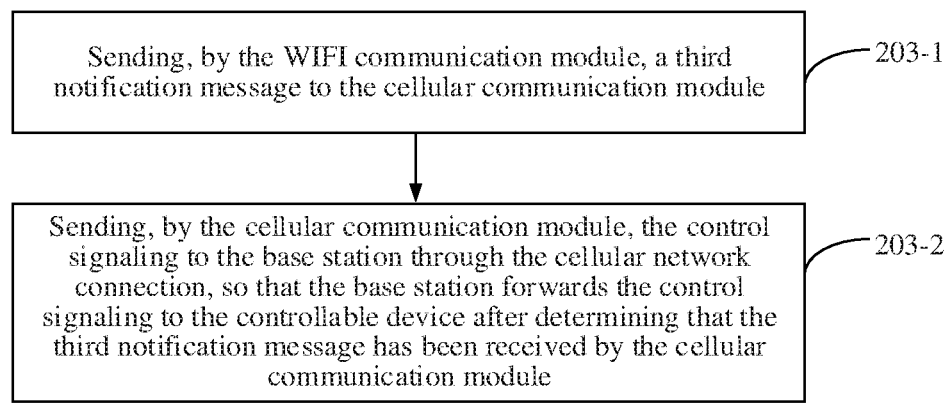
FIG. 7 is a flowchart illustrating another method for controlling a controllable, device according to an exemplary embodiment.

In an embodiment, FIG. 7 is a flowchart illustrating another method for controlling a controllable device according to the embodiment illustrated in FIG. 5. Referring to FIG. 7, the step 203 may include the following steps.

In step 203-1, the WIFI communication module sends a third notification message to the cellular communication module.

In this step, after establishing the WIFI network connection with the controllable device, the WIFI communication module supporting the WIFI communication mode sends the third notification message to the cellular communication module supporting the cellular communication mode. A content of the third notification message includes that the control apparatus has established the WIFI network connection with the controllable device.

In step 203-2, after determining that the cellular communication module has received the third notification message, the cellular communication module sends the control signaling to the base station through the cellular network connection, so that the base station forwards the control signaling to the controllable device.

In this step, after determining that the cellular communication module has received the third notification message, the cellular communication module may send the control signaling to the base station through the cellular network connection between the control apparatus and the base station, and then the base station receives the control signaling and forwards it to the controllable device through the cellular network connection between the base station and the controllable device.

In the foregoing embodiment, after the control apparatus establishes the WIFI network connection with the controllable device, the WIFI communication module may send the third notification message to the cellular communication module, so that the cellular communication module sends the control signaling to the base station through the cellular network connection. Through the above processes, one may start to control the controllable device, for example, the UAV performs the corresponding operation, such as a take-off operation, a landing operation, and the like, after the WIFI network connection has been established. Therefore, the efficient transmission of the control signaling of the controllable device is realized.

Figure 8:
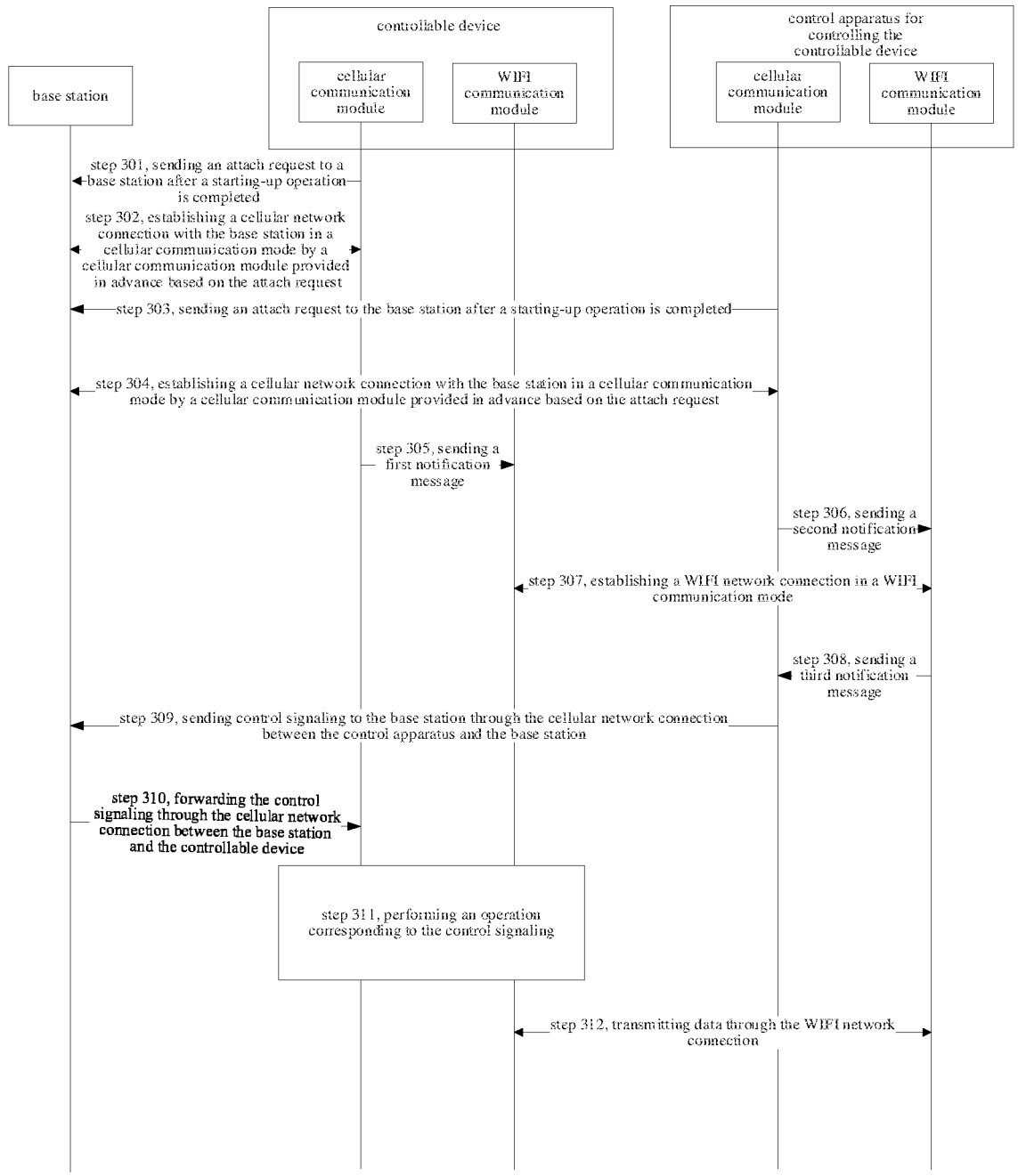
FIG. 8 is a block diagram illustrating an apparatus for controlling a controllable, device according to an exemplary embodiment.

FIG. 8 is a flowchart illustrating another method for controlling a controllable device according to an exemplary embodiment. Referring to FIG. 8, the method includes the following steps.

In step 301, a controllable device sends an attach request to a base station after completing its start-up operation.

The attach request is used for requesting attachment to a cellular network.

In step 302, the controllable device establishes a cellular network connection with the base station in a cellular communication mode by a cellular communication module provided on the controllable device in advance based on the attach request.

In step 303, a control apparatus for controlling the controllable device sends an attach request to the base station after completing its start-up operation.

The attach request is used for requesting attachment to the cellular network.

In step 304, the control apparatus establishes a cellular network connection with the base station in the cellular communication mode by a cellular communication module provided on the control apparatus in advance.

In step 305, the cellular communication module on the controllable device sends a first notification message to a WIFI communication module on the controllable device. A content of the first notification message includes that the controllable device has established the cellular network connection with the base station.

In step 306, the cellular communication module on the control apparatus sends a second notification message to a WIFI communication module on the control apparatus.

A content of the second notification message includes that the control apparatus has established the cellular network connection with the base station.

In step 307, the WIFI communication module on the controllable device and the WIFI communication module on the control apparatus establish a WIFI network connection a WIFI communication mode.

In step 308, the WIFI communication module on the control apparatus sends a third notification message to the cellular communication module.

A content of the third notification message includes that the control apparatus has established the WIFI network connection with the controllable device.

In step 309, after receiving the third notification message, the cellular communication module on the control apparatus sends control signaling to the base station through the cellular network connection between the control apparatus and the base station.

In step 310, the base station forwards the control signaling to the cellular communication module on the controllable device through the cellular network connection between the base station and the controllable device.

In step 311, the controllable device performs an operation corresponding to the control signaling.

In step 312, data is transmitted between the WIFI communication module on the controllable device and the WIFI communication module on the control apparatus through the WIFI network connection.

In the above embodiment, the controllable device may be an unmanned aerial vehicle (UAV). After the WIFI network connection is established between the control apparatus and the UAV, the control apparatus sends the control signaling to the base station through the cellular network connection between the control apparatus and the base station, and then the base station forwards the control signaling to the UAV through the cellular network connection between the base station and the UAV, so as to control the UAV to perform the corresponding operation, thereby ensuring the service quality of the transmitted control signaling. In addition, data can be transmitted between the UAV and the control apparatus through the WIFI network connection, and the data transmission rate of the WIFI network is fast, thus ensuring efficient transmission of data related to the UAV.

For easy description purpose, the above described method embodiments are described as combination of a series of steps. However, it should be appreciated by those skilled in the art that, the present disclosure is not limited to the described performing order, since some steps can be performed in other orders or performed simultaneously according to the present disclosure.

Moreover, it should be appreciated by those skilled in the art that, the embodiments described in the description are all optional embodiments, the steps and modules involved are not necessarily for the present disclosure.

Corresponding to the foregoing application function implementation method embodiments, the present disclosure also provides embodiments of an application function implementation apparatus and a corresponding terminal.

Figure 9:
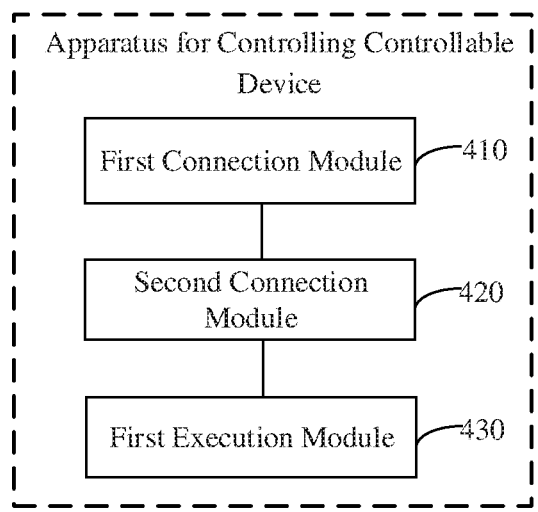
FIG. 9 is a block diagram illustrating another apparatus for controlling a controllable device according to an exemplary embodiment.

FIG. 9 is a block diagram illustrating an apparatus for controlling a controllable device which is applicable to the controllable device according to an exemplary embodiment. The apparatus includes a first connection module 410, a second connection module 420 and a first execution module 430.

The first connection module 410 is configured to establish a cellular network connection with a base station after a start-up operation is completed.

The second connection module 420 is configured to establish a wireless fidelity (WIFI) network connection with a control apparatus for controlling the controllable device after establishing the cellular network connection with the base station. The first execution module 430 is configured to transmit control signaling with the base station through the cellular network connection and transmit data with the control apparatus through the WIFI network connection. The control signaling is signaling for controlling the controllable device to perform a corresponding operation.

The controllable device is a multi-mode controllable device supporting both a cellular communication mode and a WIFI communication mode.

In the above embodiment, after the controllable device completes its start-up operation, the controllable device and the base station may perform transmission of the control signaling therebetween through the cellular network connection. In addition, data may be transmitted between the controllable device and the control apparatus through the WIFI network connection. The controllable device is a multi-mode controllable device that supports both a cellular communication mode and a WIFI communication mode. By the above processes, the control signaling of the controllable device may be transmitted through a cellular network with a high quality of service and the data may be transmitted through a WIFI network with a faster transmission rate, thereby realizing efficient transmission of the control signaling and data of the controllable device.

Figure 10:
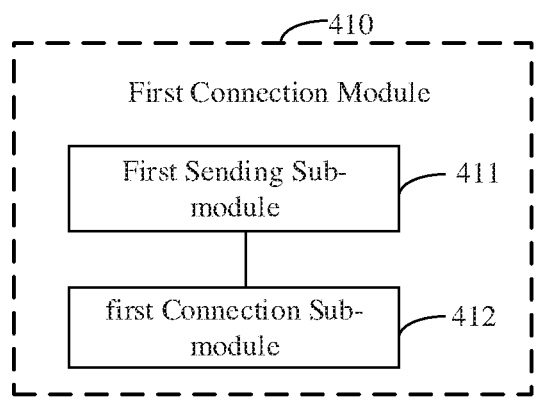
FIG. 10 is a block diagram illustrating another apparatus for controlling a controllable device according to an exemplary embodiment.

FIG. 10 is a block diagram illustrating another apparatus for controlling a controllable device on basis of the embodiment illustrated in FIG. 9. Referring to FIG. 10, the first connection module 410 includes a first sending sub-module 411 and a first connection sub-module 412.

The first sending sub-module 411 is configured to send an attach request to the base station. The attach request is used for requesting attachment to the cellular network.

Figure 11:
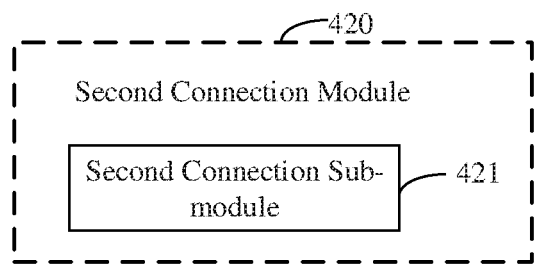
FIG. 11 is a block diagram illustrating another apparatus for controlling a controllable device according to an exemplary embodiment.

The first connection sub-module 412 is configured to establish, by a cellular communication module provided on the controllable device in advance, the cellular network connection with the base station in the cellular communication mode based on the attach request. FIG. 11 is a block diagram illustrating another apparatus for controlling a controllable device on basis of the embodiment illustrated in FIG. 9. Referring to FIG. 11, the second connection module 420 includes a second connection sub-module 421.

The second connection sub-module 421 is configured to establish, by a WIFI communication module provided on the controllable device in advance, the WIFI network connection with the control apparatus for controlling the controllable device in the WIFI communication mode.

Figure 12:
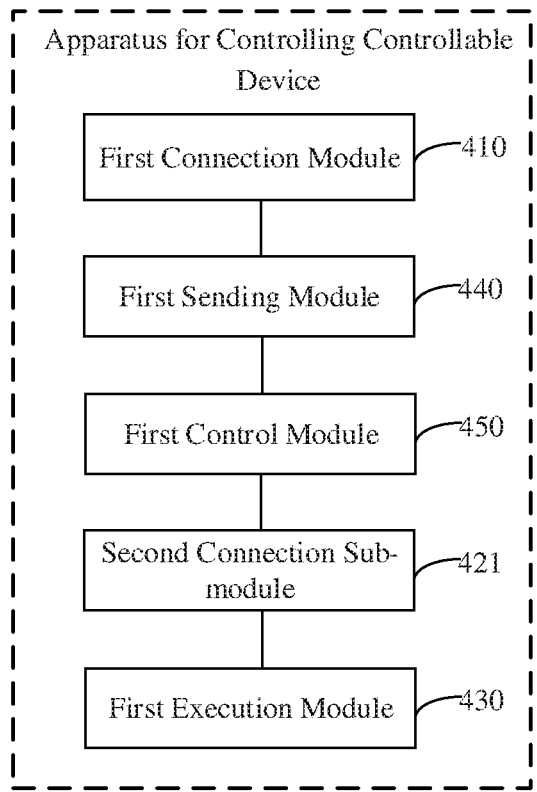
FIG. 12 is a block diagram illustrating another apparatus for controlling a controllable device according to an exemplary embodiment.

FIG. 12 is a block diagram illustrating another apparatus for controlling a controllable device on basis of the embodiment illustrated in FIG. 10 or FIG. 11. Referring to FIG. 12, the apparatus further includes a first sending module 440 and a first control module 450.

The first sending module 440 is configured to send, by the cellular communication module, a first notification message to the WIFI communication module. A content of the first notification message includes that the controllable device has established the cellular network connection with the base station.

The first control module 450 is configured to control the second connection sub-module 421 to establish, by the WIFI communication module provided on the controllable device in advance, the WIFI network connection with the control apparatus for controlling the controllable device in the WIFI communication mode, after determining that the first notification message has been received by the WIFI communication module.

In the above embodiment, the controllable device may send the attach request to the cellular network after completing its start-up operation. The attach request is used for requesting attachment to the cellular network. Further, the cellular communication module provided on the controllable device in advance establishes the cellular network connection with the base station in the cellular communication mode based on the attach request. The cellular communication module may send the first notification message to the WIFI communication module provided on the controllable device in advance after the cellular network connection has been established, and the WIFI communication module establishes the WIFI network connection with the control apparatus in the WIFI communication mode after determining that the first notification message has been received by the WIFI communication module. Through the above processes, the multi-mode controllable device establishes the cellular network connection and the WIFI network connection with the base station and the control apparatus respectively in various communication modes, thus ensuring subsequent transmission of the control signaling and data through different network connections.

Figure 13:
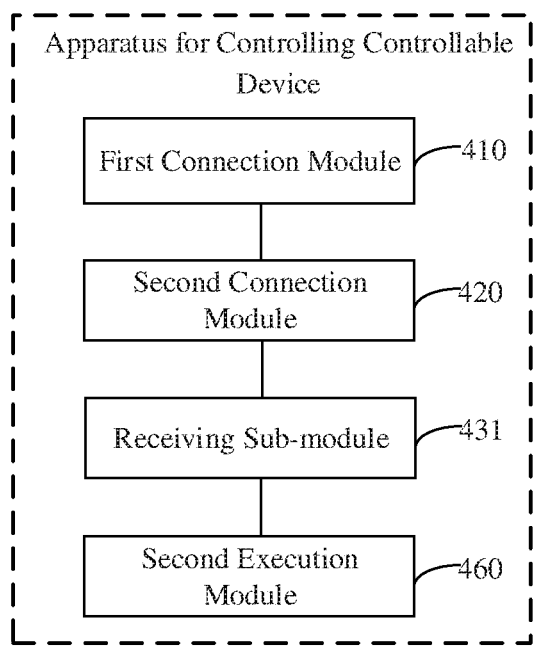
FIG. 13 is a block diagram illustrating another apparatus for controlling a controllable device according to an exemplary embodiment.

FIG. 13 is a block diagram illustrating another apparatus for controlling a controllable device on basis of the embodiment illustrated in FIG. 9. Referring to FIG. 13, the first execution module 430 includes a receiving sub-module 431.

The receiving sub-module 431 is configured to receive the control signaling forwarded by the base station through the cellular network connection. The control signaling is sent to the base station from the control apparatus.

The apparatus further includes:

a second execution module 460 configured to perform the corresponding operation according to the control signaling.

In the foregoing embodiment, the controllable device may receive the control signaling forwarded by the base station through the cellular network connection established between the controllable device and the base station, and perform the corresponding operation according to the control signaling. The control signaling is sent to the base station from the control apparatus. Therefore, the objective of controlling the controllable device by the control apparatus is achieved and the service quality of the transmitted control signaling may be ensured since the cellular communication mode is a communication mode which uses a frequency band authorized by a network provider.

Figure 14:
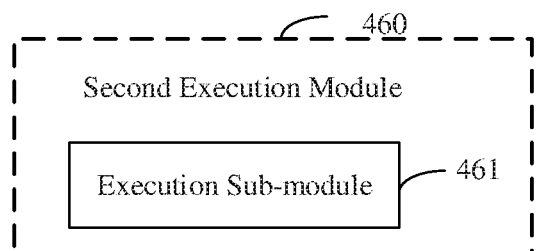
FIG. 14 is a block diagram illustrating another apparatus for controlling a controllable device according to an exemplary embodiment.

FIG. 14 is a block diagram illustrating another apparatus for controlling a controllable device on basis of the embodiment illustrated in FIG. 13. Referring to FIG. 14, the controllable device is an unmanned aerial vehicle (UAV).

The second execution module 460 includes an execution sub-module 461.

The execution sub-module 461 is configured to perform at least one of a take-off operation, a landing operation, an operation of flying along a preset trajectory and a data acquisition operation according to the control signaling.

In the above embodiment, the controllable device may be a UAV. Correspondingly, the UAV may perform at least one of a take-off operation, a landing operation, an operation of flying along a preset trajectory and a data acquisition operation according to the control signaling. In the above embodiment, after completing its start-up operation, the UAV may establish the cellular network connection with the base station and establish the WIFI network connection with the control apparatus. The UAV receives the control signaling forwarded by the base station through the cellular network connection, so as to perform at least one of a take-off operation, a landing operation, an operation of flying along a preset trajectory and a data acquisition operation. The control signaling of the UAV is transmitted through the cellular network with a high service quality, thus realizing efficient transmission of the control signaling and ultimately realizing the efficient control of the UAV. In addition, relevant data of the UAV may be transmitted through the WIFI network connection with a faster transmission rate, thus realizing the efficient transmission of the data of the UAV.

Figure 15:
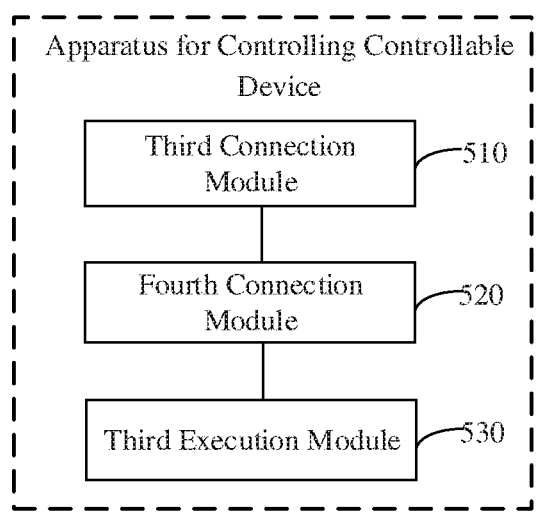
FIG. 15 is a block diagram illustrating another apparatus for controlling a controllable device according to an exemplary embodiment.

FIG. 15 is a block diagram illustrating an apparatus for controlling a controllable device, which is applicable to a control apparatus for controlling the controllable device according to an exemplary embodiment. The apparatus includes a third connection module 510, a fourth connection module 520 and a third execution module 530.

The third connection module 510 is configured to establish a cellular network connection with a base station after a start-up operation is completed.

The fourth connection module 520 is configured to establish a wireless fidelity (WIFI) network connection with the controllable device after establishing the cellular network connection with the base station.

The third execution module 530 is configured to transmit control signaling with the base station through the cellular network connection and transmit data with the controllable device through the WIFI network connection. The control signaling is signaling for controlling the controllable device to perform a corresponding operation.

In the above embodiment, after its start-up operation, the control apparatus for controlling the controllable device may also establish the cellular network connection with the base station, and establish the WIFI network connection with the controllable device. Further, the control apparatus and the base station may perform transmission of control signaling therebetween through the cellular network connection, and the control apparatus and the controllable device may perform data transmission therebetween through the WIFI network connection. Through the above processes, the control apparatus may send the control signaling to the base station through the cellular network connection established between the control apparatus and the base station, and then the base station forwards it to the controllable device through the cellular network connection established between the base station and the controllable device, thereby ensuring a service quality of the transmitted control signaling. In addition, data transmission may be performed between the control apparatus and the controllable device through the WIFI network connection. Though the WIFI communication mode is a communication mode adopting a non-authorized frequency hand, a transmission rate of the WIFI communication mode is faster than that of the cellular communication mode, so rapid data transmission may be ensured. Finally, efficient transmission of the control signaling and data of the controllable device may be achieved.

Figure 16:
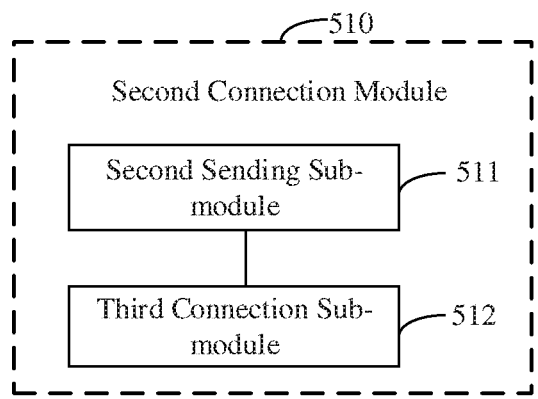
FIG. 16 is a block diagram illustrating another apparatus for controlling a controllable device according to an exemplary embodiment.

FIG. 16 is a block diagram illustrating another apparatus for controlling a controllable device on basis of the embodiment illustrated in FIG. 15. Referring to FIG. 16, the third connection module 510 includes a second sending sub-module 511 and a third connection sub-module 512.

The second sending sub-module 511 is configured to send an attach request to the base station. The attach request is used for requesting attachment to a cellular network.

The third connection sub-module 512 is configured to establish, by a cellular communication module provided on the control apparatus in advance, the cellular network connection with the base station in a cellular communication mode based on the attach request.

Figure 17:
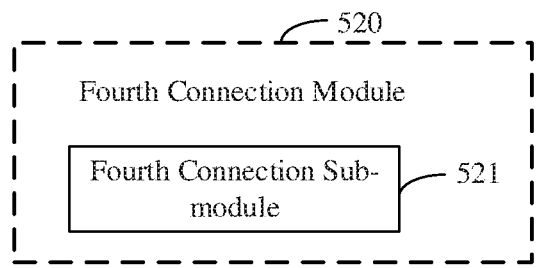
FIG. 17 is a block diagram illustrating another apparatus for controlling a controllable device according to an exemplary embodiment.

FIG. 17 is a block diagram illustrating another apparatus for controlling a controllable device on basis of the embodiment illustrated in FIG. 15. Referring to FIG. 17, the fourth connection module 520 includes a fourth connection sub-module 521.

The fourth connection sub-module 521 is configured to establish, by a WIFI communication module provided on the control apparatus in advance, the WIFI network connection with the controllable device in the WIFI communication mode.

Figure 18:
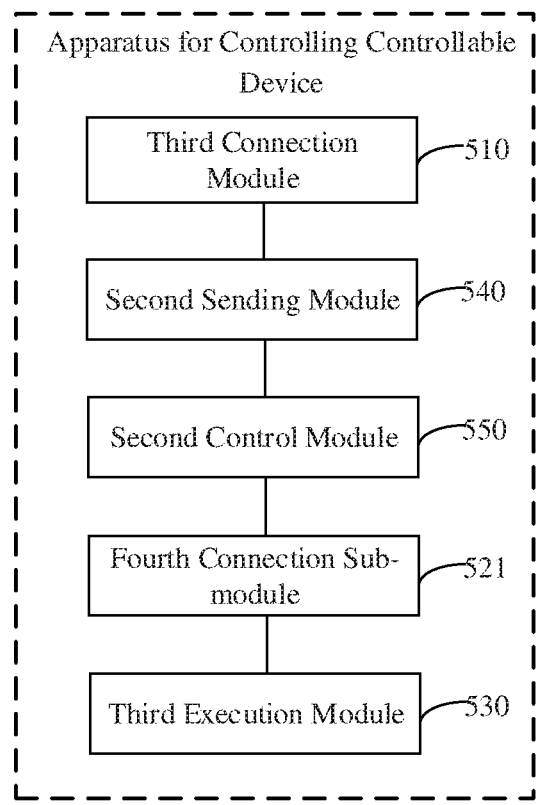
FIG. 18 is a block diagram illustrating another apparatus for controlling a controllable device according to an exemplary embodiment.

FIG. 18 is a block diagram illustrating another apparatus for controlling a controllable device on basis of the embodiment illustrated in FIG. 16 or FIG. 17. Referring to FIG. 18, the apparatus further includes a second sending module 540 and a second control module 550.

The second sending module 540 is configured to send, by the cellular communication module, a second notification message to the WIFI communication module. A content of the second notification message includes that the control apparatus has established the cellular network connection with the base station.

The second control module 550 is configured to control the fourth connection sub-module 521 to establish, by the WIFI communication module provided on the control apparatus in advance, the WIFI network connection with the controllable device in the WIFI communication mode, after determining that the second notification message has been received by the WIFI communication module.

In the above embodiment, the control apparatus may also initiate the attach request to the base station after completing its start-up operation. The attach request is used for requesting attachment to the cellular network. Further, the control apparatus establishes the cellular network connection with the base station in the cellular communication mode by the cellular communication module provided on the control apparatus in advance. The cellular communication module may send the second notification message to the WIFI communication module provided on the control apparatus in advance after the cellular network connection has been established, and the WIFI communication module establishes the WIFI network connection with the controllable device in the WIFI communication mode after determining that the second notification message has been received by the WIFI communication module. Through the above processes, the control apparatus may establish the cellular network connection and the WIFI network connection with the base station and the control apparatus respectively in various communication modes, thus ensuring subsequent transmission of the control signaling and data through different network connections.

Figure 19:
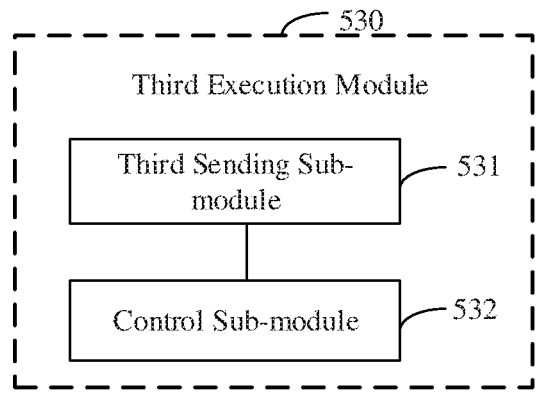
FIG. 19 is a block diagram illustrating another apparatus for controlling a controllable device according to an exemplary embodiment.

FIG. 19 is a block diagram illustrating another apparatus for controlling a controllable device on basis of the embodiment illustrated in FIG. 16 or FIG. 17. Referring to FIG. 19, the third execution module 530 includes a third sending sub-module 531 and a control sub-module 532.

The third sending sub-module 531 is configured to send, by the WIFI communication module, a third notification message to the cellular communication module. A content of the third notification message includes that the control apparatus has established the WIFI network connection with the controllable device.

The control sub-module 532 is configured to control the cellular communication module to send the control signaling to the base station through the cellular network connection, so that the base station forwards the control signaling to the controllable device, after determining that the third notification message has been received by the cellular communication module.

In the foregoing embodiment, after establishing the WIFI network connection with the controllable device, the WIFI communication module provided on the control apparatus in advance may send the third notification message to the cellular communication module provided on the control apparatus in advance. Further, after the cellular communication module receives the third notification message, the cellular communication module may send the control signaling to the base station through the cellular network connection, and the base station may forward the control signaling to the controllable device, and then the controllable device performs the corresponding operation according to the control signaling. Through the above processes, after the WIFI network connection is established between the control apparatus and the controllable device, the control apparatus sends the control signaling to the base station through the cellular network connection between the control apparatus and the base station, and then the base station forwards the control signaling to the controllable device through the cellular network connection between the base station and the controllable device, so as to control the controllable device to perform the corresponding operation, thereby ensuring the service quality of the transmitted control signaling.

The controllable device is a UAV.

The control signaling includes at least one of the following:

take-off control signaling, landing control signaling, flight control signaling for flying along a preset trajectory and data acquisition control signaling for data acquisition.

In the foregoing embodiment, when the controllable device is a UAV, the control signaling sent by the control apparatus includes at least one of the following: take-off control signaling, landing control signaling, flight control signaling for flying along a preset trajectory and data acquisition control signaling for data acquisition. In the above embodiment, after the WIFI network connection is established between the control apparatus and the UAV, the control apparatus sends the control signaling to the base station through the cellular network connection between the control apparatus and the base station, and then the base station forwards the control signaling to the UAV through the cellular network connection between the base station and the UAV, so as to control the UAV to perform the corresponding operation, thereby ensuring the service quality of the transmitted control signaling. In addition, data can be transmitted between the UAV and the control apparatus through the WIFI network connection therebetween, and the data transmission rate of the WIFI network is fast, thus ensuring efficient transmission of data related to the UAV.

For the apparatus embodiments, they substantially correspond to the method embodiments, and thus for description on related parts, please refer to the description on the method embodiments. The above mentioned apparatus embodiments are only illustrative, the units which are described as separate parts may be or may not be physically separated, and the parts shown as units may be or may not physical units, i.e., they may be located in the same place or may be distributed over a plurality of network units. All or part of the modules may be selected to realize the object of the present disclosure according to actual requirements. One of ordinary skill in this art may understand and practice this without paying creative work.

Correspondingly, the present disclosure also provides a computer readable storage medium having stored therein computer programs for performing any of the above methods for controlling the controllable device from the prospective of the controllable device.

Correspondingly, the present disclosure also provides a computer readable storage medium having stored therein computer programs for performing any of the above methods for controlling the controllable device from the prospective of the control apparatus.

Correspondingly, the present disclosure also provides an apparatus for controlling a controllable device, the apparatus being applicable to the controllable device, including:
a processor;
a memory for storing instructions executable by the processor;
wherein the processor is configured to:
establish a cellular network connection with a base station after a start-up operation is completed;
establish a wireless fidelity (WIFI) network connection with a control apparatus for controlling the controllable device after establishing the cellular network connection with the base station; and
transmit control signaling with the base station through the cellular network connection and transmit data with the control apparatus through the WIFI network connection, wherein the control signaling is signaling for controlling the controllable device to perform a corresponding operation,
wherein the controllable device is a multi-mode controllable device supporting both a cellular communication mode and a WIFI communication mode.

Figure 20:
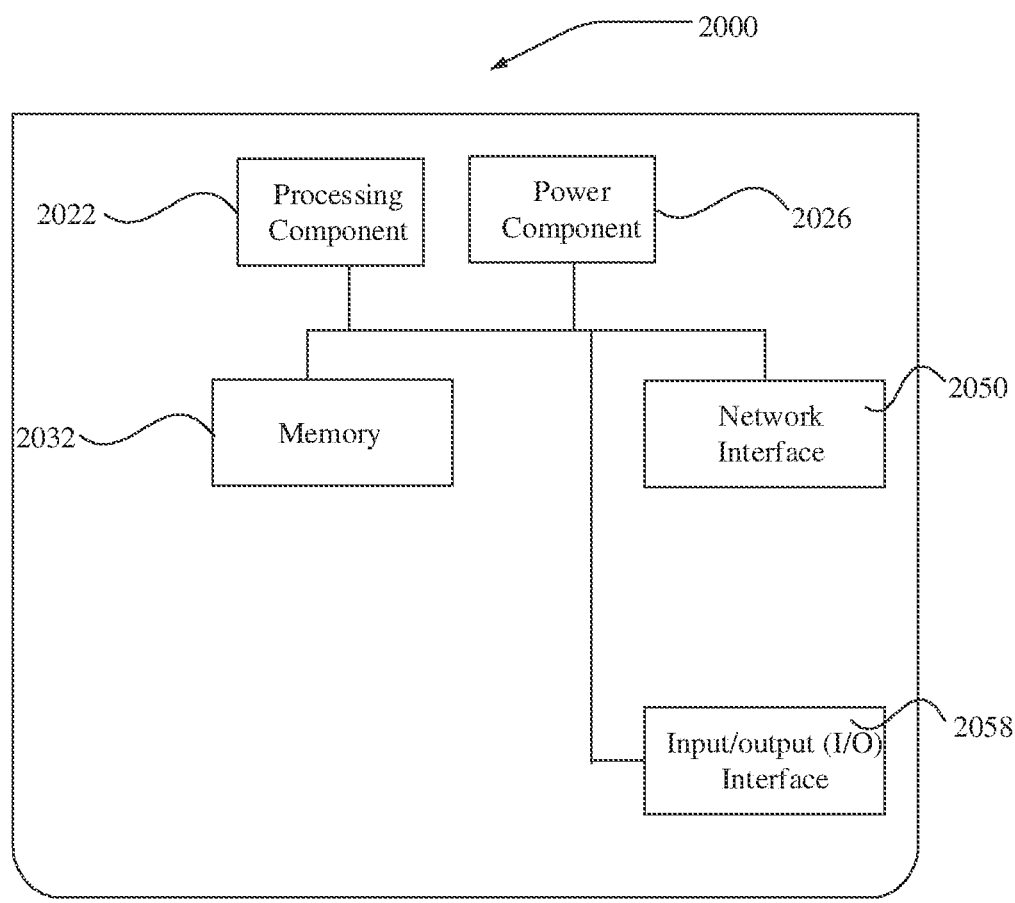
FIG. 20 is a structural schematic diagram illustrating an apparatus for controlling a controllable device according to an exemplary embodiment of the present disclosure.

FIG. 20 is a block diagram of an apparatus 2000 for controlling a controllable device according to an exemplary embodiment. For example, the apparatus 2000 may be provided as a controllable device. Referring to FIG. 20, the apparatus 2000 includes a processing component 2022 that further includes one or more processors, and memory resources represented by a memory 2032, for storing instructions executable by the processing component 1922, such as application programs. The application programs stored in the memory 2032 may include one or more modules each corresponding to a set of instructions. Further, the processing component 2022 is configured to execute the instructions to perform the above described method for controlling a controllable device.

The apparatus 2000 may also include a power component 2026 configured to perform power management of the apparatus 2000, a wired or wireless network interface 2050 configured to connect the apparatus 2000 to a network, and an input/output (I/O) interface 2058. The apparatus 2000 may operate based on an operating system stored in the memory 2032, such as Windows Server™, Mac OS X™, Unix™, Linux™, FreeBSDT™, or the like.

Accordingly, the present disclosure also provides an apparatus for controlling a controllable device, the apparatus being applicable to a control apparatus for controlling the controllable device, including:
a processor;
a memory for storing instructions executable by the processor;
wherein the processor is configured to:
establish a cellular network connection with a base station after a start-up operation is completed;
establish a WIFI network connection with the controllable device after establishing the cellular network connection with the base station; and
transmit control signaling with the base station through the cellular network connection and transmit data with the controllable device through the WIFI network connection, wherein the control signaling is signaling for controlling the controllable device to perform a corresponding operation.

Figure 21:
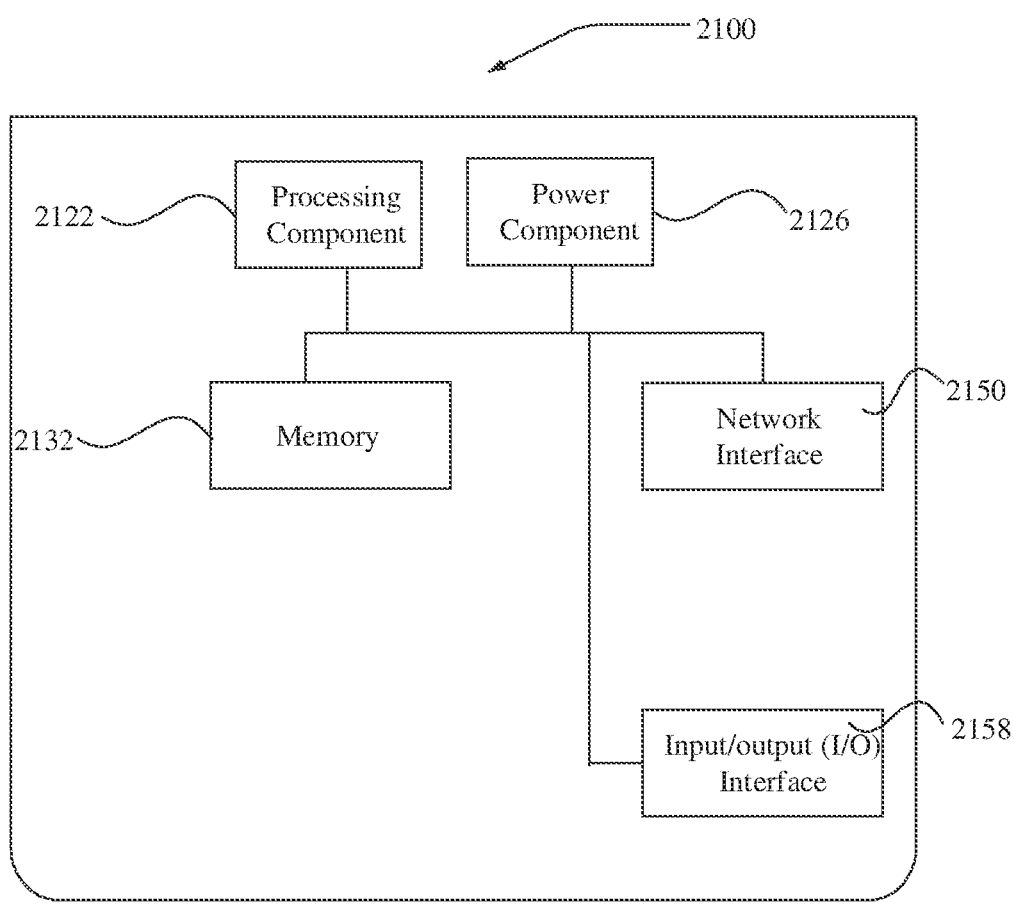
FIG. 21 is a structural schematic diagram illustrating another apparatus for controlling a controllable device according to an exemplary embodiment of the present disclosure.

FIG. 21 is a block diagram of an apparatus 2100 for controlling a controllable device according to an exemplary embodiment. For example, the apparatus 2100 may be provided as a control apparatus for controlling a controllable device. Referring to FIG. 21, the apparatus 2100 includes a processing component 2122 that further includes one or more processors, and memory resources represented by a memory 2132 for storing instructions executable by the processing component 2122, such as application programs. The application programs stored in the memory 2132 may include one or more modules each corresponding to a set of instructions. Further, the processing component 2122 is configured to execute the instructions to perform the above described method for controlling a controllable device.

The apparatus 2100 may also include a power component 2126 configured to perform power management of the apparatus 2100, a wired or wireless network interface 2150 configured to connect the apparatus 2100 to a network, and an input/output (I/O) interface 2158. The apparatus 2100 may operate based on an operating system stored in the memory 2132, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a controllable device, comprising: establishing, by the controllable device, a cellular network connection with a base station after a start-up operation is completed; establishing, by the controllable device, a wireless fidelity (WIFI) network connection with a control apparatus for controlling the controllable device after establishing the cellular network connection with the base station; and receiving, by the controllable device, control signaling from the base station through the cellular network connection and receiving, by the controllable device, data from the control apparatus through the WIFI network connection, wherein the control signaling is configured to control the controllable device to perform an operation corresponding to the control signaling, wherein the controllable device is a multi-mode controllable device supporting both a cellular communication mode and a WIFI communication mode, wherein the controllable device is an unmanned aerial vehicle, and the corresponding operation is at least one of a take-off operation, a landing operation, an operation of flying along a preset trajectory, or a data acquisition operation.

2. The method according to claim 1, wherein establishing the cellular network connection with the base station comprises:
sending an attach request to the base station, wherein the attach request is configured to request attachment to a cellular network; and
establishing, by a cellular communication module provided on the controllable device in advance, the cellular network connection with the base station in the cellular communication mode based on the attach request.

3. The method according to claim 2, wherein after establishing the cellular network connection with the base station, the method further comprises:
sending, by the cellular communication module, a first notification message to the WIFI communication module, wherein a content of the first notification message comprises that the controllable device has established the cellular network connection with the base station; and
performing the step of establishing, by the WIFI communication module provided on the controllable device in advance, the WIFI network connection with the control apparatus for controlling the controllable device in the WIFI communication mode, after determining that the first notification message has been received by the WIFI communication module.

4. The method according to claim 1, wherein establishing the WIFI network connection with the control apparatus for controlling the controllable device comprises:
establishing, by a WIFI communication module provided on the controllable device in advance, the WIFI network connection with the control apparatus for controlling the controllable device in the WIFI communication mode.

5. The method according to claim 1, wherein receiving the control signaling from the base station through the cellular network connection comprises: receiving the control signaling forwarded by the base station through the cellular network connection, wherein the control signaling is sent to the base station from the control apparatus, the method further comprises:
performing the corresponding operation according to the control signaling.

6. A method for controlling a controllable device, comprising:
establishing, by a control apparatus, a cellular network connection with a base station after a start-up operation is completed; establishing, by the control apparatus, a wireless fidelity (WIFI) network connection with the controllable device after establishing the cellular network connection with the base station; and transmitting, by the control apparatus, control signaling to the base station through the cellular network connection and transmitting, by the control apparatus, data to the controllable device through the WIFI network connection, wherein the control signaling is configured to control the controllable device to perform an operation corresponding to the control signaling, wherein the controllable device is an unmanned aerial vehicle, and the corresponding operation is at least one of a take-off operation, a landing operation, an operation of flying along a preset trajectory, or a data acquisition operation.

7. The method according to claim 6, wherein establishing the cellular network connection with the base station comprises:
sending an attach request to the base station, wherein the attach request is configured to request attachment to a cellular network; and
establishing, by a cellular communication module provided on the control apparatus in advance, the cellular network connection with the base station in a cellular communication mode based on the attach request.

8. The method according to claim 7, wherein after establishing the cellular network connection with the base station, the method further comprises:
sending, by the cellular communication module, a second notification message to the WIFI communication module, wherein a content of the second notification message comprises that the control apparatus has established the cellular network connection with the base station; and
performing the establishing, by the WIFI communication module provided on the control apparatus in advance, the WIFI network connection with the controllable device in the WIFI communication mode, after determining that the second notification message has been received by the WIFI communication module.

9. The method according to claim 7, wherein transmitting the control signaling with the base station through the cellular network connection comprises:
sending, by the WIFI communication module, a third notification message to the cellular communication module, wherein a content of the third notification message comprises that the control apparatus has established the WIFI network connection with the controllable device; and
sending, by the cellular communication module, the control signaling to the base station through the cellular network connection, so that the base station forwards the control signaling to the controllable device, after determining that the third notification message has been received by the cellular communication module.

10. The method according to claim 6, wherein establishing the WIFI network connection with the controllable device comprises:

establishing, by a WIFI communication module provided on the control apparatus in advance, the WIFI network connection with the controllable device in the WIFI communication mode.

11. An apparatus for controlling a controllable device, comprising: a processor; and a memory for storing instructions executable by the processor, wherein the processor is configured to: establish, by the controllable device, a cellular network connection with a base station after a start-up operation is completed; establish, by the controllable device, a wireless fidelity (WIFI) network connection with a control apparatus for controlling the controllable device after establishing the cellular network connection with the base station; and receive, by the controllable device, control signaling from the base station through the cellular network connection and receive, by the controllable device, data from the control apparatus through the WIFI network connection, wherein the control signaling is configured to control the controllable device to perform an operation corresponding to the control signaling, wherein the controllable device is a multi-mode controllable device supporting both a cellular communication mode and a WIFI communication mode, wherein the controllable device is an unmanned aerial vehicle, and the corresponding operation is at least one of a take-off operation, a landing operation, an operation of flying along a preset trajectory, or a data acquisition operation.

12. The apparatus according to claim 11, wherein the processor is further configured to:

send an attach request to the base station, wherein the attach request is configured to request attachment to a cellular network; and establish, by a cellular communication module provided on the controllable device in advance, the cellular network connection with the base station in the cellular communication mode based on the attach request.

13. The apparatus according to claim 12, wherein the processor is further configured to:

send, by the cellular communication module, a first notification message to the WIFI communication module, wherein a content of the first notification message comprises that the controllable device has established the cellular network connection with the base station; and establish, by the WIFI communication module provided on the controllable device in advance, the WIFI network connection with the control apparatus for controlling the controllable device in the WIFI communication mode, after determining that the first notification message has been received by the WIFI communication module.

14. The apparatus according to claim 11, wherein the processor is further configured to: establish, by a WIFI communication module provided on the controllable device in advance, the WIFI network connection with the control apparatus for controlling the controllable device in the WIFI communication mode.

15. The apparatus according to claim 11, wherein the processor is further configured to:

receive the control signaling forwarded by the base station through the cellular network connection, wherein the control signaling is sent to the base station from the control apparatus; and perform the corresponding operation according to the control signaling.

16. An apparatus for controlling a controllable device, the apparatus being applicable to a control apparatus for controlling the controllable device, comprising:

a processor; and a memory for storing instructions executable by the processor, wherein the processor is configured to perform the method of claim 6.

17. The apparatus according to claim 16, wherein the processor is further configured to:

send an attach request to the base station, wherein the attach request is configured to request attachment to a cellular network; and establish, by a cellular communication module provided on the control apparatus in advance, the cellular network connection with the base station in a cellular communication mode based on the attach request.

18. The apparatus according to claim 17, wherein the processor is further configured to:

send, by the cellular communication module, a second notification message to the WIFI communication module, wherein a content of the second notification message comprises that the control apparatus has established the cellular network connection with the base station; and establish, by the WIFI communication module provided on the control apparatus in advance, the WIFI network connection with the controllable device in the WIFI communication mode, after determining that the second notification message has been received by the WIFI communication module.

19. The apparatus according to claim 17, wherein the processor is further configured to:

send, by the WIFI communication module, a third notification message to the cellular communication module, wherein a content of the third notification message comprises that the control apparatus has established the WIFI network connection with the controllable device; and control the cellular communication module to send the control signaling to the base station through the cellular network connection, so that the base station forwards the control signaling to the controllable device, after determining that the third notification message has been received by the cellular communication module.

20. The apparatus according to claim 16, wherein the processor is further configured to:

establish, by a WIFI communication module provided on the control apparatus in advance, the WIFI network connection with the controllable device in the WIFI communication mode.

* * * * *